Fig. 2.
INPUT SIGNAL SPECTRAL WAVEFORMS

Fig. 3.

Inventor
David E. Wood
by Charles W Helzer
His Attorney

Fig. 4

Inventor
David E. Wood
by Charles W. Helzer
His Attorney

Nov. 12, 1968

D. E. WOOD

3,410,993

FLEXIBLE SIGNAL AVERAGING METHOD AND APPARATUS

Filed Dec. 10, 1963

Inventor:
David E. Wood,
by Charles W. Helger
His Attorney.

Fig. 7.

United States Patent Office 3,410,993
Patented Nov. 12, 1968

3,410,993
FLEXIBLE SIGNAL AVERAGING METHOD
AND APPARATUS
David E. Wood, Schenectady, N.Y., assignor to General
Electric Company, a corporation of New York
Filed Dec. 10, 1963, Ser. No. 329,464
15 Claims. (Cl. 235—193)

ABSTRACT OF THE DISCLOSURE

Averaging of many successive spectral cross sections of a signal, with minimum distortion, is achieved by minimizing the number of signal transfers. The successive spectral cross sections are continually recorded on a first recording medium and read out in parallel to first averaging apparatus. The resulting averaged signal is recorded in successive spectral cross sections on a second recording medium. Signals are read out of the second medium in parallel to second averaging apparatus which furnishes its averaged output signal to utilization means, or to third recording means for further averaging the signal one or more times prior to utilization.

---

The present invention relates to a flexible signal averaging method and apparatus. More particularly, the invention relates to a method and apparatus for deriving an output signal which is the average of a number of replicas of an input signal having the same form, and with which the number of signals being averaged can be readily varied over a wide range without undue distortion of this signal.

There are many applications for electronic circuits capable of analyzing electric signals received from such devices as speech analyzers and radar or sonar systems for the purpose of identifying the dominant characteristic features of such signals. In the past an important operation carried out by such circuits involved the integration or averaging of received signals to accomplish the desired emphasis of the dominant characteristic features of the signals. For the most part such integration or averaging has been achieved in the past by recirculation of the signals through a delay line to achieve addition of properly proportioned parts of the same signal to thereby accomplish the desired averaging over some preselected period. This method of integration or averaging is limited by its own inherent operational characteristics to use in only a restricted number of averaging operations before distortion of the signal being averaged occurs. The present invention overcomes this objectional limitation in previously known averaging methods apparatus.

It is therefore a primary object of the present invention to provide a new and improved method and apparatus for averaging electric signals wherein the number of times, and hence the period over which a given signal can be averaged, can be readily varied over a wide range without undue distortion of the signal.

In practicing the invention a method of averaging an electric signal is provided which comprises recording a plurality of replicas of the electric signal to be averaged, reading out the plurality of the recorded replicas simultaneously and in parallel, and subsequently summing and dividing by the number of recorded replicas to be averaged to develop an output signal that is the average of the several recorded replicas. In carrying out this method, an apparatus is provided which includes a recording medium and writing means which act on the recording medium for recording multiple replicas of a signal to be averaged. Multiple read out means are provided which are responsive to the recorded replicas on the recording medium for simultaneously reading out the multiple replicas of the signal to be averaged in parallel. The output signals from the multiple read out means are then supplied to a summing and dividing circuit means which is operatively coupled to the output of all of the multiple read out means in parallel, and derives an output signal which is representative of the average of the recorded multiple replicas of the signal.

In a preferred, particular apparatus for practicing the invention a magnetic recording drum is provided which includes a first magnetic writing head mounted adjacent to the magnetic recording drum. A first frequency modulation converter for converting an applied amplitude modulated signal to a frequency modulated signal is provided for applying the signals to be recorded to the magnetic writing head for recording several replicas of the signal to be averaged on a first track in several discrete bins spaced around the periphery of the magnetic drum. A plurality of first magnetic read heads are arranged around the first track on the magnetic recording drum for reading out several replicas of the signal to be averaged in parallel. First the demodulating circuit means are coupled to the outputs of the first magnetic read out heads. The demodulators supply output signals to a first selector switching means coupled to the output of the demodulating means for selecting the number of signal replicas to be averaged, and first summing and dividing circuit means are coupled to the output of the first selector switching means for deriving an output signal representative of the average of the several recorded input signal replicas. First gated output circuit means are operatively coupled to the output of the first summing and dividing circuit means, and are controlled by logic circuit means which are comprised by a clock track formed on a magnetic recording drum and a clock track read out head which is positioned to read out the clock track marks on the magnetic drum and develop a clock pulse signal. This clock pulse signal is supplied to a counter and divider network which is operatively coupled to the input of the first gated output circuit means for controlling the reading out of the first averaged output signals from the first summing and dividing circuit means.

The preferred form of averaging apparatus is further comprised by a second magnetic writing head mounted adjacent the magnetic recording drum, and a second frequency modulation converter for converting the first output averaged signal to a frequency modulated signal. The frequency modulated first output averaged signals are then applied to the magnetic writing head for recording several replicas of the first output averaged signal on a second track in several discrete bins spaced around the periphery of the magnetic drum. A plurality of second magnetic read heads are arranged around the second track on the magnetic recording drum for reading out the several replicas of the first output averaged signal in parallel. Second demodulating circuit means are coupled to the outputs of these second magnetic read out heads and have their outputs connected through a second selector switching means for selecting the number of first output averaged signals to be averaged to the input of a second summing and dividing circuit means. The second summing and dividing circut means then derives a second output averaged signal representative of the average of the several recorded first output averaged signal replicas. Second gated output circuit means are operatively coupled to the output of the second summing and dividing circuit means, and the logic circuit means serves to control the reading out of the second output average signal from the second summing and dividing circuit means by controlling the second gated output circuit means.

The preferred embodiment of an averaging apparatus is completed by a third magnetic writing head mounted adjacent the magnetic recording drum and controlled by a third frequency modulation converter which converts the applied amplitude modulated, second output averaged signals to a frequency modulated signal. These are applied to the magnetic writing head for recording several replicas of the second output averaged signal on a third track in several discrete bins spaced around the periphery of the magnetic drum. A plurality of third magnetic read heads are arranged around the third track on the magnetic recording drum for reading out the several replicas of the second output averaged signal in parallel. Third demodulating circuit means are coupled to the outputs of the third read out heads, and third summing and dividing circuit means are coupled to the outputs of the third demodulating circuit means through suitable third selector switching means for deriving a third output averaged signal which is representative of the average of the several recorded second output averaged signal replicas. Third gated output circuit means are operatively coupled to the output of the third summing and dividing circuit means, and are controlled by the logic circuit means so as to control the reading out of the third output averaged signal from the third summing and dividing circuit means.

Other objects, features and many of the attendant advantages of this invention will be appreciated more readily as the same becomes better understood by reference to the following detailed description, when considered in connection with the accompanying drawings, wherein like parts in each of the several figures are identified by the same reference character, and wherein.

Figure 2:
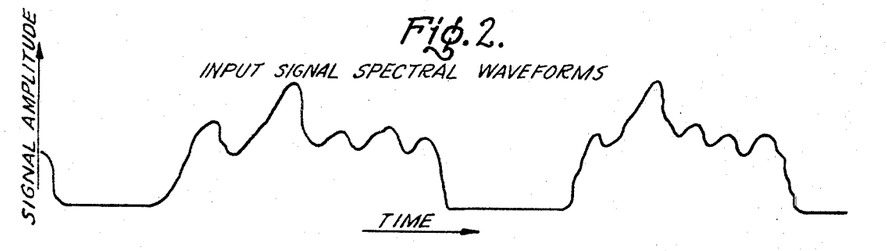
FIGURE 2 is a series of spectral curves with each curve showing a plot of amplitude versus frequency such as would be produced at the output of a spectral analyzer, and suitable for being averaged with the method and apparatus of FIGURE 1.

A very common requirement of signal processing systems such as speech analyzers or radar or sonar systems is the averaging of a signal input which has more time resolution than required, in order to obtain a desired piece of information. This averaging operation involves summing or integration of the signal over a finite period, and usually improves the signal to random noise ratio, thereby emphasing the desired dominant characteristic features of the signal. In a spectral analyzer the outputs of a bank of frequency filters are sampled sequentially and presented as a continuous energy distribution. Scannnig of the filter outputs is done repetitively at a regular rate to provide a series of spectral cross sections such as are illustrated in FIGURE 2 of the drawings. Proper analysis of signals such as those shown in FIGURE 2 of the drawings may require that the spectral distribution of the signals be averaged over the period of the signal, and such averaging can be accomplished by adding successive spectral cross sections in proper time relationship to add parts at the same frequencies, and effecting a division of the total by the number of spectral cross sections being averaged.

Averaging of a given signal input requires the storage of a previous signal cross section for addition to an extent signal cross section where the periods of the two signals are the same. The storage process should not distort the signal significantly within an amplitude range consistent with the features to be preserved in the signal. For example, if spectral cross sections such as those shown in FIGURE 2 are obtained from circuits with over 50 decibel amplitude range, it is desirable to preserve as much of this range as possible in the averaging process. The second problem of averaging involves transferring the signal to be averaged in and out of storage in a manner such that it does not significantly distort the spectral relations because of improper frequency response. In the handling of certain types of signals such as that shown in FIGURE 2, it is anticipated that some particular applications will require the summing of over 10,000 successive spectral cross sections in the averaging operation in order to derive the desired information. It can be appreciated, therefore, that if there are over 10,000 transfers of the signal being averaged in each period, the distortion in the signal would be tremendous even with nearly perfect networks. Accordingly, it is necessary that the averaging system and method employed minimize the number of signal transfers required to accomplish the averaging operation. Another requirement of the averaging method and apparatus is that the time relation between the several cross sections being averaged must be preserved with high precision in order to insure proper addition. If there are some 40 or more resolution elements in a given signal cross section to be averaged, the time relation of the averaging apparatus should be correct to say better than 1 percent accuracy. A particular advantage to be obtained from the averaging operation is that it can improve the signal to random noise ratio, particularly where the noise introduced by the averaging operation is at least partially random with respect to the signal repetition periods.

The present invention provides a new and improved averaging method and apparatus utilizing recording of the information to be averaged in a manner such that the number of signal transfers are minimized. By this means it is possible to add some 10,000 or more successive cross sections with perhaps no more than four write ins and read outs of any particular signal cross section. The basic means of minimizing the signal transfers is to store several periods of the signal to be averaged (that is to store several successive spectral cross sections such as shown in FIGURE 2) in the storage device, and then sum the stored periods in a single operation. As a consequence, if 10 periods or more are added at a time, there is a comparable reduction in the number of times that any particular period is operated upon. A convenient storage medium for this purpose is magnetic tape or a magnetic drum. In a particular example of the invention herein disclosed, the track or tracks of a magnetic drum serve as the storage medium, with each track being capable of storing some 12 periods of signal to provide the basis for implementing this concept.

Figures 1, 1A:
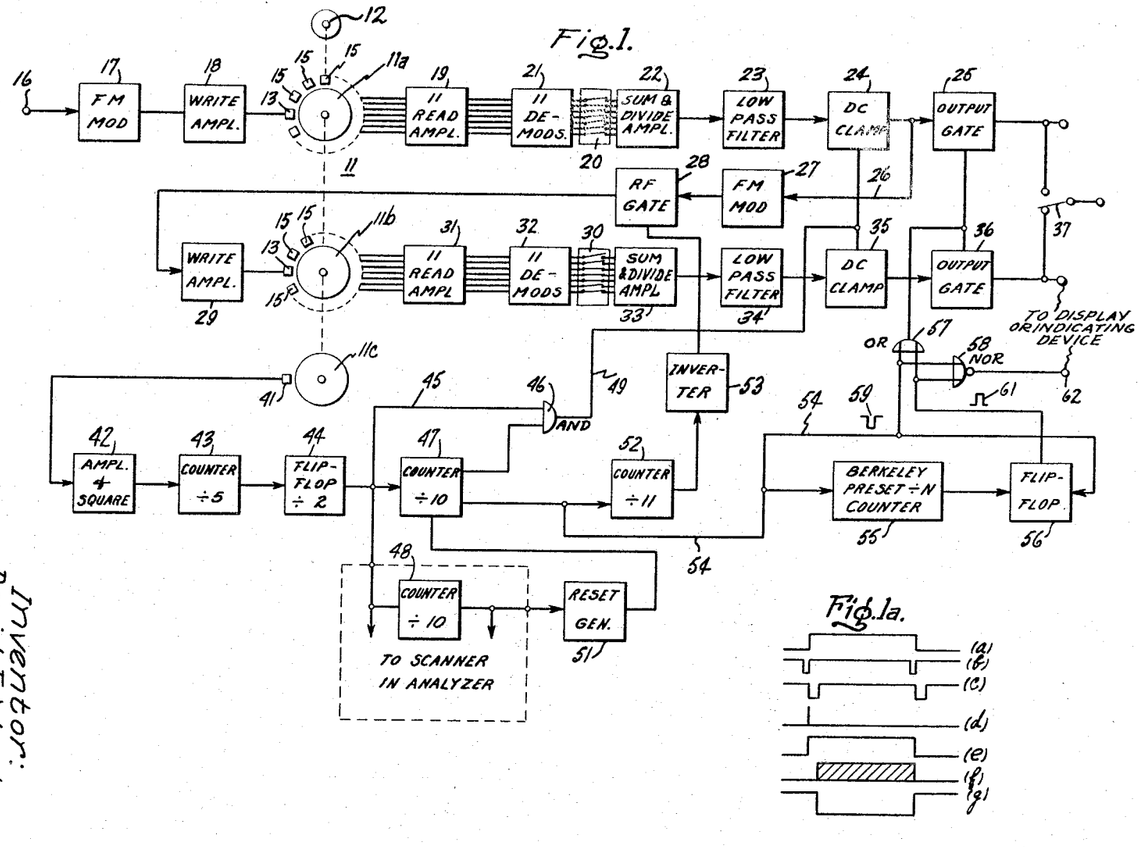
FIGURE 1 is a functional block diagram illustrating the method, and one apparatus for carrying out the new and improved flexible signal averaging technique made possible by the present invention.
FIGURE 1a is a waveform diagram to aid in the description of FIGURE 1.

In the embodiment of the invention shown in FIGURE 1 of the drawings, a magnetic drum 11 is shown which is comprised by at least two recording tracks 11a and 11b, and a clock track 11c driven by a suitable constant speed drive motor 12. The magnetic drum 11 and drive motor 12 are conventional equipment that is commercially available from such concerns as the Bryant Manufacturing Co, Each of record tracks 11a and 11b are acted on by a magnetic writing head 13. The magnetic recording drum 11 differs from other conventional magnetic recording arrangements in that it includes a plurality of magnetic read out heads 15 arranged around the periphery of the record tracks 11a and 11b so as to read out several discrete storage bins or locations on the surface of the record track simultaneously and in parallel. In all other respects, the magnetic write heads 13 and the magnetic read out heads 15 all are of conventional construction, and need not be described further.

The magnetic write head 13 associated with the first record track 11a is operatively coupled to a source of input signals to be averaged that are applied to an input terminal 16. These input signals are supplied through an FM modulation circuit means 17, and through a write amplifier 18 to the magnetic write head 13. The FM modulator 17 may comprise any conventional, commercially available frequency modulation circuit, for example, such as those described in Section 9.2.3 of the text book entitled "Transistor Circuit Engineering," edited by R. F. Shea, and published by John Wiley and Sons, Inc., New York, N.Y., copyright 1957, Library of Congress Catalog Card Number 57–8896. Similarly, the write amplifier 18 is a conventional current amplifier such as those described in Section 4.5 of the above identified "Transistor Circuit Engineering" textbook.

The plurality of magnetic read out heads 15, which in the particular embodiment of the invention shown in FIGURE 1 are comprised by 11 read out heads, are connected through 11 individual read amplifiers 19, and 11 individual demodulating circuits 21 to a selector switching circuit means 20 connected in the input of a summing and dividing amplifier circuit means 22. The read amplifiers 19 may be comprised by any suitable preamplifier construction such as that on page 3–33 of the text book entitled "Selected Semiconductor Circuits Handbook," copyright 1960, edited by S. Schwartz, and published by John Wiley and Sons, Inc. of New York, N.Y., Library of Congress Catalog Card No. 60–10324. The 11 demodulator circuits 21 likewise are of conventional construction, and may be of the type described in Section 11.5.1.4 of the above identified "Transistor Circuit Engineering," textbook, while the selector switching means comprises a bank of single pole, single throw switches with one switch for each individual output from the demodulating circuits 21. The summing and dividing amplifier 22 will be described more fully hereinafter in connection with FIGURE 3 of the drawings. The summing and dividing circuit means 22 serves to derive an output signal which is the average of all of the selected 11 input signals supplied from the 11 different magnetic read out heads 15 through the read amplifiers 19, and demodulators 21. Thus, the averaged output signal may represent the output of all 11 input signals, 2 input signals, or some intermediate number as determined by the setting of the selector switching means 20. This averaged output signal is supplied through a low pass filter 23 of conventional construction and through a DC restoring circuit 24 to an output gate 25. The DC restoring circuit 24 is merely a DC clamp which serves to clamp the output of the low pass filter 23 to a reference potential, for example, ground potential, in between each output signal supplied from the output of the summing and dividing circuit means 22. The output gate 25 is a conventional transistor gate which will be described more fully in connection with FIGURE 3, and serves to block all signal outputs from the summing and dividing amplifier except when the gate is opened by a logic circuit means to be described more fully hereinafter.

The averaged output signal from the summing and dividing circuit means 22, in addition to being supplied to the output gate 25 is supplied through a conductor 26 and second FM modulator 27 to a radio frequency or otherwise high frequency gate 28 which in conjunction with output gate 25, comprises a first gated output circuit means. The first output averaged signals supplied through radio frequency or RF gate 28 are applied through a write amplifier 29 to the magnetic write head 13 of the second record track 11b on the magnetic recording drum 11. The FM modulator 27 is identical to the modulator 17, and the radio frequency or RF gate 28 constitutes a high frequency transistor gate of the type described in Section 10.5 of the above identified "Transistor Circuit Engineering" textbook. Write amplifier 29 may be identical in construction to the write amplifier 18, and serves to derive a sufficient output current to drive the magnetic write head 13.

The magnetic record track 11b also has arranged around its periphery 11 magnetic read out heads 15 whose outputs are supplied through 11 read amplifiers 31, and 11 demodulators 32 through a second selector switching means 30 to the input of a second summing and dividing circuit means 33. All of the elements 31, 32, and 33 are similar in construction and operation to the corresponding elements in the first described signal channel associated with record track 11a. The summing and dividing circuit means 33 functions to derive a second output averaged signal which is the average of 11 first output averaged signals from the first summing and dividing circuit means 22, and to supply this second output averaged signal through a low pass filter 34 and DC clamping circuit 35 to a second gated output circuit 36. The output signals from the two gated output circuits 25 and 36 may be supplied to the individual output terminals associated therewith, or may be supplied through a suitable selector switch 37 to an appropriate display device such as a cathode ray tube, a recorder or other indicating instrument designed for displaying the averaged output signals supplied through these gated output circuits.

In order to control the gated output circuits 25, 28, and 36 as well as the DC restoring circuits 24 and 35, logic circuit means are provided. The logic circuit means is comprised by a clock track indicated at 11c which is formed by a series of magnetic clock marks on the periphery of the magnetic drum, and which is read out by a magnetic clock read out head 41. The clock read out head 41 serves to derive a series of clock pulses which are supplied through an amplifying and squaring (pulse shaping) circuit 42 which may comprise a conventional monostable transistor multivibrator of the type described in Section 10.7.1 of the above identified "Transistor Circuit Engineering" textbook. In the particular embodiment of the invention shown in FIGURE 1, a clock pulse signal having 1200 pulses per revolution was generated for synchronizing purposes. This clock pulse signal is supplied through a series of counter and divider network for utilization in the synchronizing process of turning on and off the respective gates. For this purpose, the amplified and squared clock pulses appearing at the output of the pulse shaping circuit 42 are applied to a divide by 5 counter circuit 43 of conventional construction such as those described in Section 10.6.5 of the above identified "Transistor Circuit Engineering" handbook. From the divide by 5 counter 43 the clock pulses are applied to a divide by 2 flip flop circuit 45 which may comprise nothing more than a conventional bistable multivibrator similar to those described in the above referred to Section 10.6.5 of the "Transistor Circuit Engineering" textbook. The output clock pulses (which now have been divided by 10) appearing at the output of the flip flop 44 are supplied through a conductor 45 to an "and" gate 46 of conventional construction, and to the input of a second divide by 10 counter 47, and to the input of a third divide by 10 counter 48. The divide by 10 counters 47 and 48 may be similar in construction to the divide by 5 counter 43, and the "and" gate 46 is of conventional construction such as one of those described in Section 10.5 of the above identified "Transistor Circuit Engineering" textbook. The output clock pulse supplied through the "and" gate 46 is then applied over the conductor 49 to control each of the DC clamping circuits 24 and 35.

The counter circuit 47, which is reset by the counter 48 through the medium of a reset generator 51, also supplies its output to a divide by 11 counter circuit 52 whose output is connected through a polarity inverter circuit 53 to control the RF gate 28 which comprises a part of the gated output circuit means operatively connected to the output of the first summing and dividing circuit 22. The reset generator 51 may be similar in construction to the pulse shaping circuit 42, and serves to reset the counter 47 at the end of each cycle of 10 pulses. The counter 52 is similar in construction to the counters 43, 47, and 48 but is modified to provide a divide by 11 count, and the polarity inverter 53 may comprise an inverter circuit such as that disclosed on page 6–63 of the above identified "Selected Semiconductor Circuits Handbook." By this arrangement it can be appreciated that the RF gate 28 will be operated or opened at the end of each 1100 pulses produced by the clock pulse read out head 41. Since there are 11 read out heads 15 arranged around the periphery of the first record track 11a on the magnetic recording drum 11, it can be appreciated that each bin or space on the surface of the magnetic record track 11a on which the signal to be averaged is recorded is represented by 100 clock pulses on the clock pulse track 11c. Accordingly, upon the completion of the writing in of 11 replicas of the signal to be averaged in 11 bins on the magnetic record track 11a, the clock pulse signal will actuate the counter 52 which then operates through inverter 53 to open the RF gate 28, and to read in a first output averaged signal from the output of the first summing and dividing circuit means 22 to the write head 13 associated with the second magnetic record track 11b. This process is repeated on each 11/12 of a revolution of the magnetic recording drum.

In addition to the output signal supplied to the counter 52, counter 47 also applies an output signal over the conductor 54 to the input of a Berkley preset counter 55 at the end of each 100 clock pulses. The Berkley preset counter 55 is a commercially available counter that can be preset to divide input signal pulses by any desired number, and then to provide an output pulse. This output pulse is applied to the input of a flip flop circuit 56 whose output is applied to an "or" and "nor" circuit 57 or 58. The "or" and "nor" circuits 57 and 58 also have inputs supplied thereto over an extension of the conductor 54 directly from the output from the counter 47. The signal pulses supplied from the output of the counter 47 and the conductor 54 to "or" and "nor" circuits 57 and 58 are negative going signal pulses as indicated at 59. As a consequence these signal pulses in effect operate as blanking signals which are applied to the output gates 25 and 36 to cause these gates to be cut off thereby preventing any output signal from being supplied to the output selector switch 37. The signals appearing at the output of the flip flop circuit 56 are positive going in nature, as indicated at 61, so that these signals when supplied to the output gates 25 and 36 through the "or" circuit 57 operate as gating on signals so as to open the output gates 25 and 36, and apply an output signal through the output selector switch 37 to an output indicating device connected to one of the associated output terminals. The blanking and gating pulses applied through the "nor" circuit 58 to an output terminal 62 are applied to the indicating instrument such as a cathode ray tube oscilloscope for synchronizing purposes.

In operation the series of spectral curves such as shown in FIGURE 2 of the drawings are applied to the input terminal 16 of the flexible signal averaging apparatus. These signals are then supplied through the FM modulator 17 and write amplifier 18 to the magnetic writing head 13 where they are recorded on the first magnetic recording track 11a of the magnetic recording drum. It should be noted that in the particular application of the averaging apparatus herein described, synchronizing of the recording of the spectral curves with the clock track pulse read out is achieved by the application of a synchronizing signal applied to the spectral scanner device from the outputs of the flip flop 44 and counter 48. These synchronizing signal pulses are used to synchronize operation of the spectral scanner with the clock pulse signals being generated by the clock read out head 41 to thereby properly synchronize recording of the spectral curves on the first record track 11a with the clock pulse marks previously formed on the clock track 11c. In other averaging operations, it may be necessary to reverse this process wherein the clock pulse marking and subsequent read out is synchronized with the incoming signal to be averaged.

Upon the completion of the writing in of 11 replicas of the spectral curves to be averaged, a first averaged output signal will be produced at the output of the first summing and dividing circuit 22. This first averaged output signal is then applied through the low pass filter 23 and DC clamp 24 to the output gate 25, and through the FM modulator 27 to the RF gate 28. Concurrently with the above action, some 1100 clock signal pulses will have been produced by the clock read out head 41 so that the counter 52 will have been actuated to develop a gating "on" pulse at the output of the polarity inverter circuit 53. This gating "on" pulse, which may have the form shown in FIGURE 1a, curve a, turns on the RF gate 28 to allow the first output averaged signal to be supplied to the write amplifier 29, and to the write head 13 where it is recorded on the surface of the second record track 11b. It should be noted that prior to the above action taking place, at the end of every 100 clock pulses, and therefore at the end of the writing in of a single spectral cross section in one of the 11 bins in which such curves are recorded on track 11a, the counter 47 opens the "and" gate 46 to apply a clamping signal through the conductor 49 to the DC clamping circuits 24 and 35. This action serves to restore the DC level at the inputs to gates 25 and 36 during the blank intervals between each signal cross section recorded on record track 11a. This clamping signal is shown in FIGURE 1a, curve b and is required in order to allow operation of gates 25 and 36 to their off condition. Immediately thereafter, a blanking signal 59 is supplied over the conductor 54 and through the "or" gate 57 to the output gates 25 and 36, thereby turning off these gates so as to prevent the application of an output signal to the output selector switch 37.

This blanking signal is negative going in nature, and is shown in curve c of FIGURE 1a. Upon the completion of one averaging operation when an output signal which is representative of the average of 11 replicas of the input signal is obtained (assuming the selector switching means 20 is set for 11 averages), and is recorded on the second record track 11b in the above manner, it is then necessary to obtain 10 more such first averaged output signals, and record the same on the second record track 11b. Thereafter, upon completion of the recording of 11 replicas of the first averaged output signal on record tracks 11b (and again assuming selector switching means 30 is set for 11 averages), a second averaged output signal will be developed at the output of the second summing and dividing circuit means 33 which is representative of the average of all 11 of the first averaged output signals. Since the first averaged output signal represents an average of 11 input signals, the second averaged output signal will represent an average of 11 times 11 or 121 input signals. This second averaged output signal may then be supplied through the low pass filter 34 and DC clamping circuit 35, and through the second gated output circuit means 33, and output selector switch 37 to the indicating instrument or other recording device.

It should be noted that the above description assumes that the maximum number of averages possible with the averaging apparatus shown in FIGURE 1 was desired. It should be noted that if desired, any number of averages between 2 and 121 can be obtained with the apparatus of FIGURE 1. Such flexibility in the number of averaging operations carried out may be readily achieved by appropriate settings of the selector switching means 20 and 30, and adjustment of the Berkley preset (divide by N) counter 55 to a desired read out rate. If the selector switching means 20 and 30 are adjusted to provide averaging of 121 signal cross sections, and the counter 55 preset to provide a count of 121, then upon the occurrence of 121 bins of information having been averaged, an output signal pulse such as that shown in curve d of FIGURE 1a will be applied to the flip flop 56. Flip flop 56 thereafter operates to develop the output gating pulse 61 whose form is shown in curve e of FIGURE 1a, which opens the output gates 25 and 36, and thereby apply gated output signals such as that shown in curve f of FIGURE 1a to the output selector switch 37. If it is desired to obtain the average of a number of signals less than 121, all that is required is that selector switching means 20 and 30 be adjusted to provide the desired number of signal cross sections to be averaged, and counter 55 be set to count to the desired number of averages, for example, two or twenty-five or sixty, and upon the completion of the recording in of that number of replicas on the record tracks 11a, 11b, the output gates 25 and 36 will be actuated to provide the desired averaged output signal through the individual associated output terminal or through the output selector switch 37 to the indicating instrument connected to the apparatus. The form of these gated output signals is shown in curve f of FIGURE 1a. The form of the synchronizing signal supplied through the "nor" circuit 58 and terminal 62 to the indicating instrument associated with the averaging apparatus is shown in curve g of FIGURE 1a.

Figure 3:
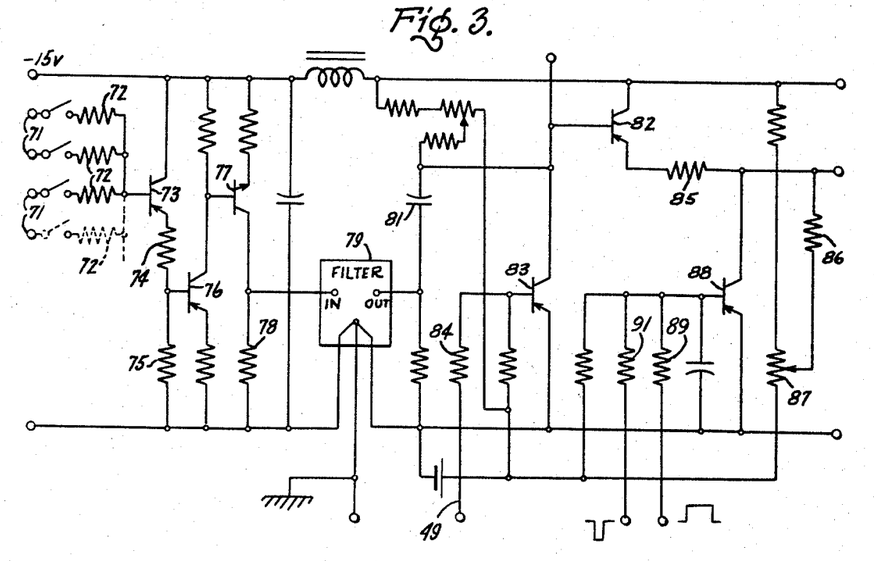
FIGURE 3 is a detailed circuit diagram of a summing and dividing circuit suitable for use in the apparatus shown in FIGURE 1.

FIGURE 3 of the drawings shows the circuit details of the summing and dividing circuit means 22 or 33 with its associated low pass filter 23 or 34, DC clamp 24 or 35, and output gate 25 or 36. In the circuit of FIGURE 3, the several inputs from the 11 demodulator circuits are applied through the input terminals 71 through the individual selector switch of the selector switching means 20 or 30, and across individual input resistors 72 to the base electrode of a PNP junction transistor 73. The emitter electrode of the PNP junction transistor 73 is connected through a pair of load resistors 74 and 75 to ground, and the collector electrode of the transistor is connected to a −15 volt direct current power supply. The individual input resistors 72 are properly proportioned to, in effect, develop across the input of the transistor 73 an input voltage representative of $\frac{1}{11}$ of the potential appearing at the output of the individual demodulators, so that the total effect of the input resistor matrix comprised by the resistors 72 is to effect a division of the 11 demodulator outputs by a factor of 11. The several potentials appearing across the input resistors 72 are then summed by the summing amplifier stage comprised by transistor 73, and the summed output signal supplied through a two stage resistance coupled amplifier comprised by a PNP transistor 76 and NPN transistor 77 whose output load resistor 78 is connected to the input of the low pass filter circuit 79. This signal represents the average of all of the individual signal inputs applied through the closed selector switches across the input resistors 72 to the base electrode of the PNP transistor 73, and hence represents an average of the several replicas of the input signal to be averaged. For more complete description of the manner of operation of the summing amplifier, reference is made to Section 5.4.1 of the above identified "Transistor Circuit Engineering" textbook edited by R. F. Shea.

The signal appearing at the output of the schematically illustrated low pass filter 79 is supplied through a large coupling capacitor 81 to the base electrode of a PNP transistor 82. The base electrode of the PNP transistor 82 is also directly coupled through a second PNP transistor 83 to ground. The base electrode of the PNP transistor 83 in turn is connected to a suitable source of biasing potential and through the dropping resistor 84, and the conductor 49 to the output of the "and" gate 46 shown in FIGURE 1. As a consequence, upon the application of a negative going clamping pulse from "and" gate 46 supplied through the conductor 49 to the base of the transistor 83, transistor 83 is rendered conductive, and serves as a driven D.C. clamp to clamp the base of the PNP transistor 82 to ground. The PNP transistor 82 has its emitter electrode connected through two fixed resistors 85, 86, and a variable resistor 87 to a source of bias potential. Effectively connected in parallel with resistors 86 and 87 is a PNP transistor 88 directly connected between ground, and the junction of limiting resistor 85 and the load resistor 86. The PNP transistor 88 has its base electrode connected through a limiting resistor 89 to the source of positive gating pulses supplied from flip flop 56 through "or" gate 57. The base of transistor 88 also is connected through a limiting resistor 91 and "or" gate 57 to the source of negative going blanking signal pulses applied from the counter 47 across conductor 54. Accordingly, it can be appreciated that upon the occurrence of a negative blanking signal pulse, the PNP transistor 88 will be turned full on so as to clamp a direct short to ground across the load resistors 86 and 87 thereby prevent any output signal pulses being supplied to the indicating instrument connected to the output gating circuits 25 or 36. In contrast, upon the occurrence of a positive going gating signal pulse supplied through resistor 89 to the base electrode of PNP transistor 88, this transistor will be turned full off so that output signal pulses can be developed across the output load resistors 86 and 87.

Figure 4:
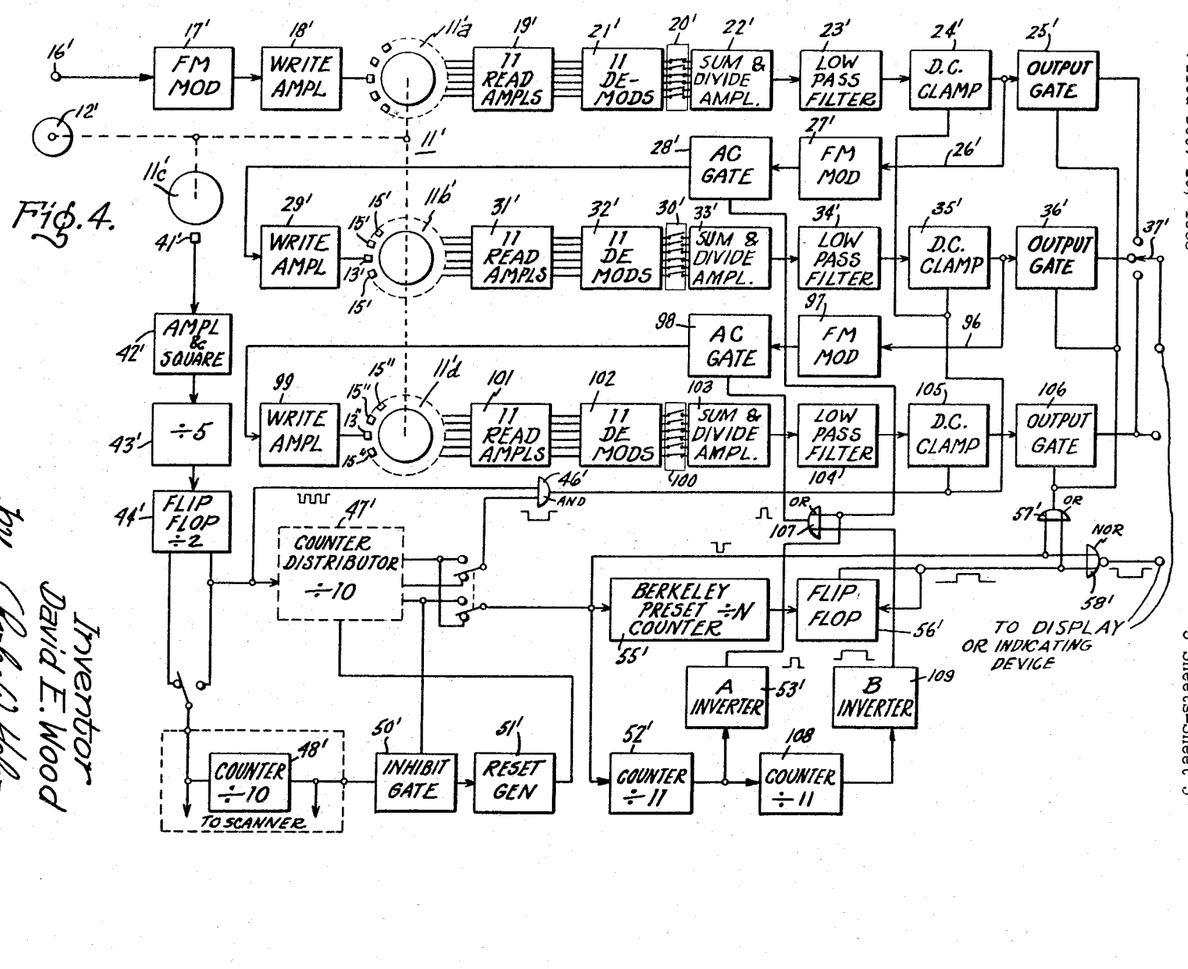
FIGURE 4 is a functional block diagram of a three-track version of a new and improved flexible signal averaging apparatus constructed in accordance with the invention, and illustrates how the apparatus can be readily adapted to increase greatly the number of averaging operations which it can carry out without undue distortion of the signal being averaged.

FIGURE 4 of the drawings shows a three track version of the new and improved signal averaging apparatus, and illustrates how flexible the apparatus is, and how it can be readily modified to provide any desired number of signal averaging operations. The signal averaging apparatus shown in FIGURE 4 is similar to the apparatus shown in FIGURE 1, but is capable of processing up to 1331 signal cross sections to derive a third output average signal which is the average of 1331 input signals. Because the first two stages of the averaging apparatus shown in FIGURE 4 are identical in construction and operation to the equipment shown in FIGURE 1, like parts of the apparatus shown in FIGURE 4 have been given the same reference numeral primed in order to identify their construction and function.

The averaging apparatus shown in FIGURE 4 differs from the equipment shown in FIGURE 1 however in that it includes a third magnetic record track 11d. The second output averaged signal appearing at the input of the output gate 36', and hence the signal effectively coupled from the output of the second summing and dividing circuit 33', is supplied over a conductor 96 through a frequency modulation circuit 97, and high frequency gate circuit 98 to the input of a write amplifier 99. The FM modulator 97 corresponds in construction and operation to the FM modulator 27', the RF gate 98 likewise corresponds to the RF gate 28', and the write amplifier 99 is similar in construction and operation to the write amplifier 29'. The output signal from the write amplifier 99 is applied to the magnetic write head 13" which can serve to record 11 different replicas of the second output averaged signal on the magnetic record track 11d. These 11 replicas of the second averaged output signal are read out by 11 read amplifiers 101 that are similar in construction and operation to the read amplifiers 19' and 31', and the signals thus derived are supplied to 11 different demodulator circuits 102. The outputs from the demodulating circuits 102 are supplied through selector switch means 100 to the input of the summing and dividing circuit 103. The summing and dividing circuit 103 is similar in construction and operation to the circuit shown in FIGURE 3 of the drawings, and serves to derive a third output averaged signal which is the average of 11 of the second output averaged signals or some smaller number depending on the setting of the selector switch means. This third output averaged signal is then supplied through a low pass filter 104 and DC clamping circuit 105, through a third output gate 106 and the output selector switch 37′ to an output indicating instrument such as a cathode ray oscilloscope or the like, or to some other circuits for additional processing. Since each of these elements are similar in construction and operation to the corresponding parts in the first two channels of the equipment, which were described more fully in connection with FIGURE 1, a further description of the operation of these elements is believed unnecessary.

The logic circuit means of the apparatus shown in FIGURE 4 which is used to control the gated output circuit means comprised by the output gates 25′, 36′, and 106 and the corresponding high frequency gates 28′ and 98 differs somewhat from the apparatus shown in FIGURE 1. With respect to the operation of the DC clamping circuits 24′, 35′, and 105, the logic circuitry is the same for the operation of these circuits as the logic circuitry described in connection with the embodiment of the invention shown in FIGURE 1. The logic circuit means of the apparatus shown in FIGURE 4 does differ from the logic circuitry of the equipment shown in FIGURE 1, however, in the inclusion of an "or" gate circuit 107 connected to the output of the inverter circuit 53′. By reason of the inclusion of this element, the inverter 53′ when actuated by the counter circuit 52′ serves to open the high frequency gate 28′ and also the high frequency gate 98′. An additional difference lies in the fact that the output of the counter 52′ is also supplied to an additional counter 108 whose output is applied through a polarity inverter circuit 109 and through the "or" gate 107 to the high frequency gate 98. With respect to the construction and operation of the Berkley preset (divide by N) counter 55′ this device operates in precisely the same manner as with the equipment shown in FIGURE 1 with the exception that the output of the "or" gate 57′ is now supplied to the three output gates 106, 36′ and 25′ instead of just to two of the output gates. As a consequence of the above modifications, the apparatus of FIGURE 4 can be used to obtain the average of up to 1331 signal cross sections by simply reading into the selector switch means 20′, 30′ and 100, and the Berkley preset counter the desired number of averages to be obtained. Accordingly, it can be appreciated that the invention makes available a signal averaging method and apparatus which can be readily adapted to provide any desired number of averaging operations on an input signal. Further, it can be appreciated that this rather large number of averaging operations can be obtained without processing any one signal cross section any more than 3 times. As a consequence, very little if any distortion is introduced into this signal as a result of the averaging operation, and results in the derivation of an entirely reliable averaged output signal wherein the dominant characteristic features of the signal can be readily identified. Further, by obtaining a signal readout from appropriate output terminals at the various stages of the apparatus, it is possible to derive output signals which have been averaged over different time periods. For example, by deriving an output directly from the gate 25 in FIGURE 1, a signal averaged over a different time period is obtained from that obtained from the output of gate 37. These differently averaged output signals may even be derived concurrently to provide multiple read outs. The degree of overlap of the successive scans may be adjusted by the setting of preset counter 25. Another way to achieve the same result over even smaller integration or averaging periods would be by appropriate adjustment of the selector switching means 20 or 30.

Figure 5:
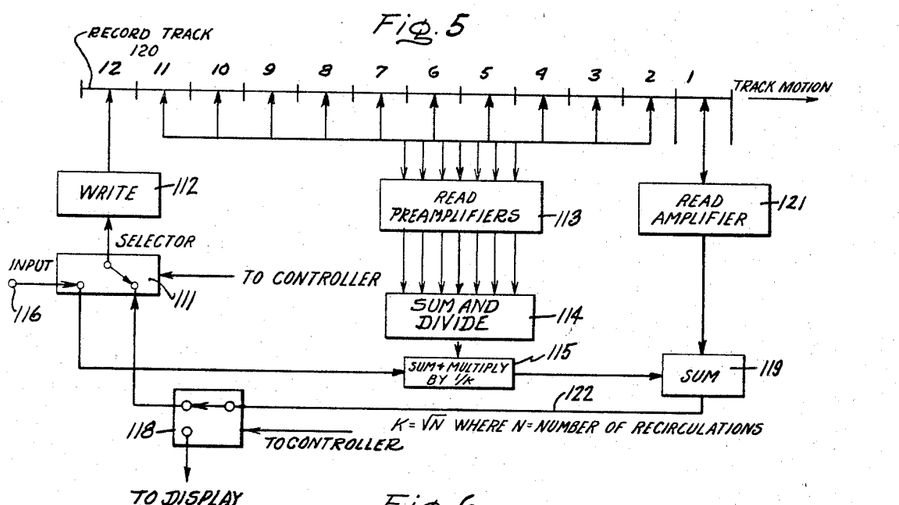
FIGURE 5 is a functional block diagram of a different form of signal averaging apparatus capable of practicing the invention.
Figure 6:
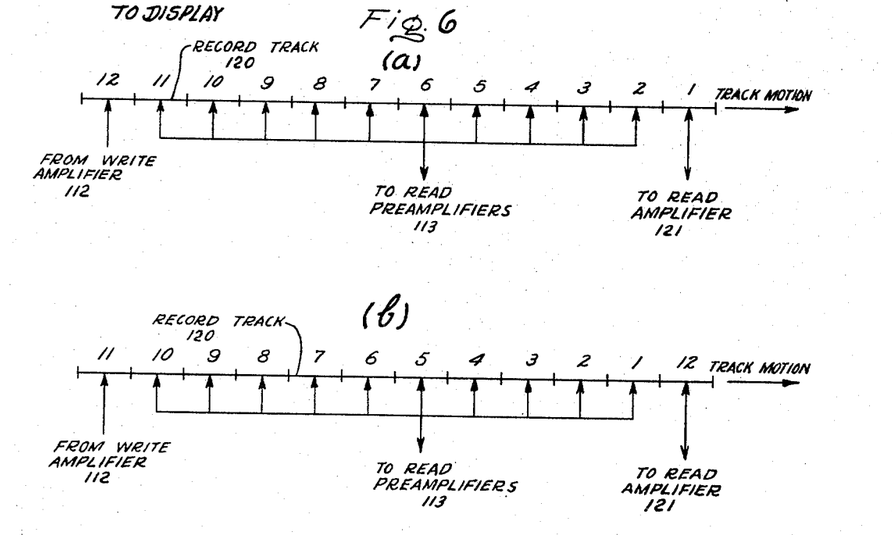
FIGURE 6 is a schematic representation of the manner in which signals are recorded on a magnetic drum comprising a part of the signal averaging apparatus shown in FIGURE 5.

A different form of the averaging method and apparatus made possible by the present invention is illustrated in FIGURE 5 of the drawings. In FIGURE 5, a record track 120 is depicted wherein each of the bins or storage spaces in which a signal replica to be averaged is recorded is represented by the numerals 1–11 and is depicted in the read out position, and the bin numbered 12 is positioned under the write head. An input signal to be averaged is supplied through an input selector 111 which is controlled from a suitable controller unit, and applied through a write amplifier 112 to the magnetic write head. If it is assumed that each of the bins 2–11 have previously been recorded upon by the magnetic write head, and that the bin number 1 has previously had an averaged or summed signal recorded thereon, then the controller will be adjusted to switch the selector switch from the input terminal to the recirculation terminal position shown in FIGURE 5. With the averaging apparatus thus arranged, all of the replicas of the input signals to be averaged on bins 2–11 will be read out by their corresponding read out heads, amplified by read preamplifiers 113, and applied to a summing and dividing circuit means 114. The summing and dividing circuit means 114 serves to derive an output averaged signal representative of the average of all of the replicas of the input signal recorded on the bins 2–11. This output averaged signal is then applied to a sum and multiply circuit means 115 along with the next recurring input signal supplied to the input terminal 116. The sum and multiplying circuit means 115 then sums together the output averaged signal, and the next recurring input signal to be averaged, and multiplies their sum by the factor $1/K$ where K is equal to the square root of N with N being the number of recirculations to be accomplished. The number of recirculations, of course, is controlled from the central controller unit which controls both the input selector 111 and a display selector switch 116. The resulting signal appearing at the output of the sum and multiplying circuit 115 is then applied to a second summing circuit 119 along with the previous averaged signal read out from the storage bin No. 1 on the magnetic recording medium through the read amplifier 121. The resulting summed signal is then recirculated back through a closed loop, provided by a conductor 122, and the display selector switch 118 to the recirculation circuit terminal of the input selector switch 111. It is then applied to the write amplifier 112, and recorded on the storage bin number 12. In this manner, following each recirculation of the first averaged signal derived from the output of the summing circuit 119, there will be a regression in the position of the averaged signal storage bin on the recording medium. This regression is illustrated in FIGURE 6 of the drawing wherein FIGURE 6a represents the condition illustrated by FIGURE 5. In FIGURE 6a, storage bin 1 has the previous averaged signal replica, and the storage bins 2–11 contain individual signal records to be averaged. After the next succeeding recirculation cycle, the storage bin 12 will have the averaged signal with the individual signal records recorded in storage bins 1–10 in the manner shown in FIGURE 6b of the drawings, and the resulting summation of those signals will be recorded on storage bin 11. In a similar fashion, regression of the location of the previously averaged signal on the magnetic recording medium will occur throughout the number of recirculations desired. This number of recirculations can be any desired number since it is unlimited by reason of the fact of the inclusion of the summing and multiplying circuit means 115 wherein a correction for improper scaling of the signal due to the recirculation is obtained during each recirculation cycle. By this means, the amplitude of the averaged output signal ultimately supplied to the display device by the display selector switch 118, when actuated by the controller, will be maintained within a prescribed amplitude range, thereby assuring that distortion will not be introduced into the signal as a result of the recirculating process.

While the embodiment of the invention shown in FIGURE 5 requires only 1 record track and a minimum number of read out heads in order to accomplish any desired number of averaging operations, it has the disadvantage of increasing the number of handlings of any particular cross section to obtain a desired number of averaging operations. For example, if it were desired to average a signal at least 121 times with the circuit arrangement of FIGURE 5, it would be necessary to recirculate any given signal cross section through the recording medium some 10 or 11 times. In contrast to this number of handlings, with the equipment shown in FIGURE 1 of the drawings it would be possible to obtain 121 signal averages while at the same time handling any given signal cross section only twice. Accordingly, it can be appreciated that while the arrangement shown in FIGURE 5 does possess certain advantages in minimizing the amount of equipment required, it does possess certain inherent operational disadvantages which might make it more desirable to employ a more complex form of the apparatus such as shown in FIGURE 1 or FIGURE 4 of the drawings.

Figure 7:
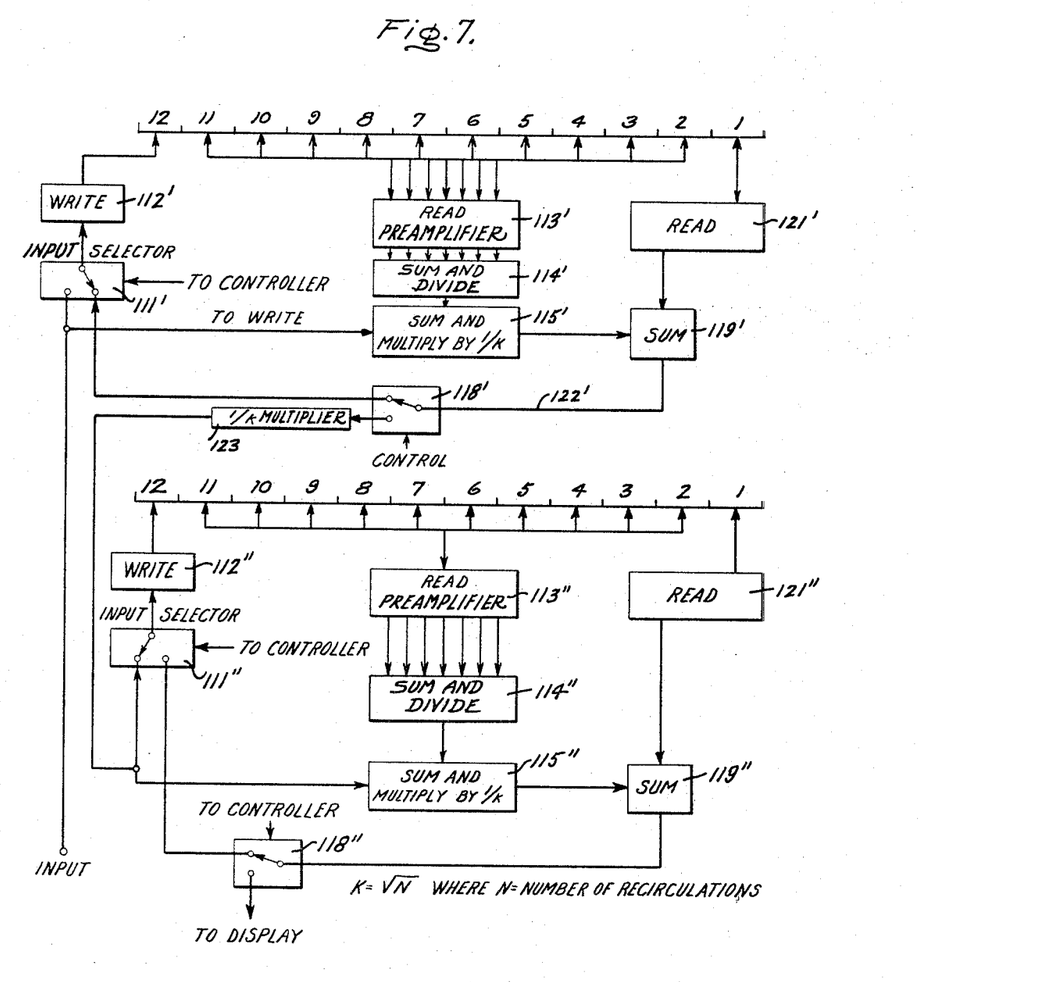
FIGURE 7 is a functional diagram of a more complex form of the signal averaging apparatus constructed along the lines of that illustrated in FIGURE 5.

FIGURE 7 of the drawings illustrates a further version of the form of averaging apparatus illustrated in FIGURE 5. In the arrangement of FIGURE 7, an additional recirculation path has been added to the single recirculation path of the arrangement shown in FIGURE 5. Since each of the elements of the recirculation paths of the FIGURE 7 apparatus are identical in construction and operation to the corresponding elements of the recirculation path of the FIGURE 5 apparatus, the FIGURE 7 elements have been given the same reference numeral as the corresponding parts of the apparatus shown in FIGURE 5. However, in the FIGURE 7 arrangement the reference numerals of the elements of the first recirculation path are primed with a single prime, and the elements of the second recirculation path have been double primed. Since each recirculation path operates in the same manner as previously described in connection with the single recirculation path of the apparatus shown in FIGURE 5, it is not believed necessary to trace through in detail the construction and operation of the arrangement of FIGURE 7. There is one additional element, however, which is included in the FIGURE 7 arrangement, and that is the provision of a $1/K$ multiplying circuit 123 inserted between the output of the first display controller 118′, and the second input selector 111″. The inclusion of the $1/K$ multiplier makes possible further descaling of the averaged output from the first recirculation path.

The arrangement shown in FIGURE 7 makes it possible to obtain a maximum number of signal averaging operations with a minimum amount of equipment. It would be, of course, possible to extend this maximum range by the addition of even a third recirculation path, but such extension is believed to be obvious from the arrangement of FIGURE 7 since all that would be required would be the insertion of an additional $1/K$ multiplier in between the output of the second recirculation path, and the input to the third recirculation path. Obviously, even additional numbers of recirculation paths could be included if it were desired to obtain such large averaging operations. The arrangement of FIGURE 7 while it does have the disadvantage of increased numbers of handling of each signal cross section, would allow a maximum number of averaging operations with a minimum of equipment with the number of averaging operations being restricted only by the number of recirculations that could be tolerated without unduly distorting the signal due to the large number of handlings of individual cross sections. Within this restriction, however, there would be a large number of averaging operations possible with a minimum amount of equipment which for certain applications would make the arrangement shown in FIGURE 7 feasible.

From the foregoing description, it can be appreciated that the present invention provides a new and improved method and apparatus for averaging electric signals wherein the number of times that any given signal cross section can be averaged can be readily varied over a wide range up to a large number of averaging operations without in any manner unduly distorting the original signal input as a result of the averaging operations.

Having described several embodiments of a signal averaging apparatus and method in accordance with the invention, it is believed obvious that other modifications and variations of the present invention are possible in the light of the above teachings. It is therefore to be understood that changes may be made in the particular embodiments of the invention described which are within the full intended scope of the invention as defined by the appended claims.

What I claim as new and desire to secure by Letters Patent of the United States is:

1. A signal averaging apparatus including in combination a recording medium, writing means acting on said recording medium for recording multiple replicas of the signal to be averaged on said recording medium, multiple read out means responsive to the recorded replicas on said recording medium for simultaneously reading out the multiple replicas of the signal to be averaged in parallel, and summing and dividing circuit means operatively coupled to each of the outputs of said multiple read out means in parallel for deriving an output signal representative of the average of the recorded multiple signals.

2. A signal averaging apparatus including in combination a recording medium, writing means acting on said recording medium for recording multiple replicas of the signal to be averaged on said recording medium, multiple read out means responsive to the recorded replicas on said recording medium for simultaneously reading out the multiple replicas of the signal to be averaged in parallel, first summing and dividing circuit means operatively coupled to the outputs of said multiple read out means in parallel for deriving a first output signal representative of the average of the recorded multiple signals, a second recording medium, second writing means acting on said second recording medium, the input of said second writing means being coupled to the output of said first summing and dividing circuit means for recording multiple replicas of the first output averaged signal on said second recording medium, multiple second read out means responsive to the recorded replicas on said second recording medium for simultaneously reading out the multiple replicas of the first output averaged signal in parallel, second summing and dividing circuit means operatively coupled to the outputs of said multiple second read out means in parallel for deriving a second output signal representative of the average of the recorded multiple replicas of the averaged first output signal, and logic circuit means operatively coupled intermediate said first summing and dividing circuit means and said second writing means for supplying only the first output averaged signals to the second writing means.

3. A signal averaging apparatus including in combination a recording medium, writing means acting on said recording medium for recording multiple replicas of the signal to be averaged on said recording medium, multiple read out means responsive to the recorded replicas on said recording medium for simultaneously reading out the multiple replicas of the signal to be averaged in parallel, summing and dividing circuit means operatively coupled to the outputs of said multiple read out means in parallel for deriving an output signal representative of the average of the recorded multiple signals, additional recording mediums, additional writing means acting on the respective associated additional recording mediums, the input of said additional writing means being coupled to the output of a preceding summing and dividing circuit means for recording multiple replicas of the output averaged signal from a preceding averaging stage on each of said additional recording mediums, additional multiple read out means responsive to the recorded replicas on each of the respective associated additional recording mediums for simultaneously reading out the multiple replicas of the output averaged signal in parallel, and additional summing and dividing circuit means operatively coupled to the outputs of the respective associated multiple second read out means in parallel for deriving additional output signals representative of the average of the recorded multiple averaged earlier output signals, and logic circuit means operatively coupled intermediate each summing and dividing circuit means and the next succeeding additional writing means for supplying only the preceding output averaged signals to the succeeding additional writing means.

4. A signal averaging apparatus including in combination a first recording medium, first writing means acting on said first recording medium for recording multiple replicas of the signal to be averaged on said first recording medium, multiple read out means responsive to the recorded replicas on said first recording medium for simultaneously reading out the multiple replicas of the signal to be averaged in parallel, first summing and dividing circuit means operatively coupled to the outputs of said multiple read out means in parallel for deriving a first output signal representative of the average of the recorded multiple signals, a second recording medium, a second writing means acting on said second recording medium, the input of said second writing means being operatively coupled to the output of said first summing and dividing circuit means for recording multiple replicas of the first output averaged signal on said second recording medium, multiple second read out means responsive to the recorded replicas on said second recording medium for simultaneously reading out the multiple replicas of the first output averaged signal in parallel, second summing and dividing circuit means operatively coupled to the outputs of said multiple second read out means in parallel for deriving a second output signal representative of the average of the recorded multiple replicas of averaged first output signal, logic circuit means operatively coupled intermediate said first summing and dividing circuit means and said second writing means for supplying only the first output averaged signals to the second writing means, a third recording medium, third writing means acting on said third recording medium, the input of said third writing means being operatively coupled to the output of said second summing and dividing circuit means for recording multiple replicas of the output twice averaged second output signal on said third recording medium, multiple third read out means responsive to the recorded replicas on said third recording medium for simultaneously reading out the multiple replicas of the twice averaged second output signal in parallel, third summing and dividing circuit means operatively coupled to the outputs of said multiple third read out means in parallel for deriving a third output signal representative of the average of the recorded multiple twice averaged second output signals, and additional logic circuit means operatively coupled intermediate said summing and dividing circuit means and said third writing means for supplying only the output twice averaged second output signals to the third writing means.

5. The combination set forth in claim 1 including recirculating circuit means operatively coupled intermediate the output of the summing and dividing circuit means and the input of the writing means for recirculating the averaged output signal with additional input signal through the recording medium to thereby obtain a further averaged output signal.

6. The combination set forth in claim 3 including recirculating circuit means operatively coupled intermediate the output of at least one of the summing and dividing circuit means and the input of the next succeeding writing means for recirculating the averaged output signal with additional input signals to thereby obtain a further averaged output signal.

7. The method of averaging an electric signal which comprises recording a plurality of replicas of the electric signal, reading out the plurality of recorded replicas simultaneously, summing and dividing by the number of recorded replicas to be averaged to develop an output signal that is the average of the several recorded replicas, recording a plurality of replicas of the averaged output signal, reading out the plurality of recorded replicas of the averaged output signal simultaneously, and summing and dividing by the number of recorded replicas of said averaged output signal to be averaged to develop a second output signal that is the average of the several recorded replicas of the first averaged output signal.

8. The method of averaging an electric signal which comprises recording a plurality of replicas of the electric signal, reading out the plurality of recorded replicas simultaneously, summing and dividing by the number of recorded replicas to be averaged to develop a first output signal that is the average of the several recorded replicas, recording a plurality of replicas of the first averaged output signal, reading out the plurality of recorded replicas of the first averaged output signal simultaneously, summing and dividing by the number of recorded replicas of said first averaged output signal to be averaged to develop a second output signal that is the average of several recorded replicas of the first averaged signal, recording a plurality of replicas of the second averaged output signal, reading out the plurality of recorded replicas of the second averaged output signals simultaneously, and summing and dividing by the number of recorded replicas of said second averaged output signal to be averaged to develop a third output signal that is the average of the several recorded replicas of the second averaged output signal.

9. A signal averaging apparatus including in combination a magnetic recording drum, a magnetic write head mounted adjacent said magnetic recording drum for recording several replicas of an input signal to be averaged in several discrete bins around said drum, a plurality of magnetic read heads arranged around the recording drum for reading out the several replicas of the signal to be averaged in parallel, summing and dividing circuit means operatively coupled to the output of said magnetic read heads in parallel for deriving an output signal representative of the average of the several recorded signal replicas, selector switching means operatively coupled to the input of said summing and dividing circuit means for selecting the number of signal replicas to be averaged, gated output circuit means coupled to the output of said summing and dividing circuit means, and logic circuit means operatively coupled to and controlling said gated output circuit means.

10. A signal averaging apparatus including in combination a magnetic recording drum, a magnetic write head mounted adjacent said magnetic recording drum for recording several replicas of an input signal to be averaged in several discrete bins around said drum, a plurality of magnetic read heads arranged around the magnetic recording drum for reading out the several replicas of the signal to be averaged in parallel, summing and dividing circuit means operatively coupled to the output of said magnetic read heads in parallel for deriving an output signal representative of the average of the several recorded signal replicas, selector switching means operatively coupled to the input of said summing and dividing circuit means for selecting the number of signal replicas to be averaged, gated output circuit means coupled to the output of said summing and dividing circuit means, and logic circuit means operatively coupled to and controlling said gated output circuit means, said logic circuit means comprising a second track formed around the periphery of the magnetic drum and having a plurality of magnetic clock marks thereon, a magnetic clock read out head positioned to read out the clock marks and to develop a clock pulse signal, and a counter and divider network operatively coupled to the output of the magnetic clock read out head and to the input of the gated output circuit means for controlling said gated output circuit means.

11. A signal averaging apparatus including in combination a magnetic recording drum, a first magnetic write head mounted adjacent said magnetic recording drum for recording several replicas of a signal to be averaged in several discrete bins on a first track around said drum, a plurality of first magnetic read heads arranged around the first track on the recording drum for reading out the several replicas of the signal to be averaged in parallel, first summing and dividing circuit means operatively coupled to the output of said first magnetic read heads in parallel for deriving an output signal representative of the average of the several recorded signal replicas, first selector switching means operatively coupled to the input of said summing and dividing circuit means for selecting the number of signal replicas to be averaged, first gated output circuit means coupled to the output of said first summing and dividing circuit means, logic circuit means operatively coupled to and controlling said gated output circuit means, a second magnetic write head mounted adjacent said magnetic recording drum for recording several replicas of the first output averaged signal in several discrete bins around a second track on said drum, said second magnetic write head being coupled to the output of said first gated output circuit means, a plurality of second magnetic read heads arranged around the second track on the recording drum for reading out the several replicas of the first output averaged signal in parallel, second summing and dividing circuit means operatively coupled to the output of said second read heads in parallel for deriving an output signal representative of the average of several recorded first output averaged signal replicas, second selector switching means operatively coupled to the input of said summing and dividing circuit means for selecting the number of replicas of the first output averaged signals to be averaged, second gated output circuit means coupled to the output of said second summing and dividing circuit means, and second logic means operatively coupled to and controlling said second gated circuit output circuit means.

12. A signal averaging apparatus including in combination a magnetic recording drum, a magnetic writing head mounted adjacent said magnetic recording drum, a frequency modulation converter for converting an applied amplitude-modulated signal to a frequency modulation signal and applying the same to the magnetic writing head for recording several replicas of a signal to be averaged on a single track in several discrete bins spaced around the periphery of the magnetic drum, a plurality of magnetic read heads arranged around the single track on the recording drum for reading out the several replicas of the signal to be averaged in parallel, demodulating circuit means coupled to the outputs of said magnetic read out heads, selector switching means coupled to the outputs of said demodulating circuit means for selecting the number of signal replicas to be averaged, summing and dividing circuit means coupled to the outputs of said selector switching means for deriving an output signal representative of the average of the several selected recorded input signal replicas, gated output circuit means operatively coupled to the output of said summing and dividing circuit means, said magnetic recording drum having a clock track formed thereon, a clock track read out head positioned to read out the clock track on the magnetic drum and to develop a clock pulse signal, and a counter and divider network operatively coupled to the output from the clock read out head and to the input of the gated output circuit means for controlling the reading out of the averaged signal from the summing and dividing circuit means at an appropriate point in the revolution of the magnetic recording drum.

13. A signal averaging apparatus including in combination a magnetic recording drum, a first magnetic writing head mounted adjacent said magnetic recording drum, a first frequency modulation converter for converting an applied amplitude-modulated signal to a frequency modulation signal and applying the same to the magnetic writing head for recording several replicas of a signal to be averaged on a first track in several discrete bins spaced around the periphery of the magnetic drum, a plurality of first magnetic read heads arranged around the first track on the recording drum for reading out the several replicas of the signal to be averaged in parallel, first demodulating circuit means coupled to the outputs of said first magnetic read out heads, first selector switching means coupled to the outputs of said first demodulating circuit means for selecting the number of signal replicas to be averaged, first summing and dividing circuit means coupled to the outputs of said first selector switching means for deriving an output signal representative of the average of the several recorded input signal replicas, first gated output circuit means operatively coupled to the output of said summing and dividing circuit means, said magnetic recording drum having a clock track formed thereon, a clock track read out head positioned to read out the clock track on the magnetic drum and to develop a clock pulse signal, and a counter and divider network operatively coupled to the output from the clock read out head and to the input of the first gated output circuit means for controlling the reading out of the averaged signal from the first summing and dividing circuit means at an appropriate point in the revolution of the magnetic recording drum, a second magnetic writing head mounted adjacent said magnetic recording drum, a second frequency modulation converter for converting an applied amplitude-modulated signal to a frequency modulation signal and applying the same to the magnetic writing head for recording several replicas of the first output averaged signal on a second track in several discrete bins spaced around the periphery of the magnetic drum, a plurality of second magnetic read heads arranged around the second track on the recording drum for reading out the several replicas of the first output averaged signal in parallel, second demodulating circuit means coupled to the output of said second magnetic read out heads, second selector switching means coupled to the outputs of said second demodulating circuit means for selecting the number of first output averaged signal replicas to be averaged, second summing and dividing circuit means coupled to the outputs of said second selector switching means for deriving a second output signal representative of the average of the several recorded first output averaged signal replicas, second gated output circuit means operatively coupled to the output of said summing and dividing circuit means, said counter and divider network that is operatively coupled to the output from the clock read out head also being coupled to the input of the second gated output circuit means for controlling the reading out of the second output averaged signal from the second summing and dividing circuit means at an appropriate point in the revolution of the magnetic recording drum.

14. A signal averaging apparatus including in combination a magnetic recording drum, a first magnetic writing head mounted adjacent said magnetic recording drum, a first frequency modulation converter for converting an applied amplitude-modulated signal to a frequency modulation signal and applying the same to the magnetic writing head for recording several replicas of a signal to be averaged on a first track in several discrete bins spaced around the periphery of the magnetic drum, a plurality of first magnetic read heads arranged around the first track on the recording drum for reading out the several replicas of the signal to be averaged in parallel, first demodulating circuit means coupled to the outputs of said first magnetic read out heads, first selector switching means coupled to the output of the first demodulator circuit means for selecting the number of signal replicas to be averaged, first summing and dividing circuit means coupled to the outputs of said first selector switching means for deriving an output signal representative of the average of the several recorded input signal replicas, first gated output circuit means operatively coupled to the output of said first summing and dividing circuit means, said magnetic recording drum having a clock track formed thereon, a clock track read out head positioned to read out the clock track on the magnetic drum and to develop a clock pulse signal, and a counter and divider network operatively coupled to the output from the clock read out head and to the input of the first gated output circuit means for controlling the reading out of the first averaged output signal from the first summing and dividing circuit means at an appropriate point in the revolution of the magnetic recording drum, a second magnetic writing head mounted adjacent said magnetic recording drum, a second frequency modulation converter for converting an applied amplitude-modulated signal to a frequency modulation signal and applying the same to the magnetic writing head for recording several replicas of the first output averaged signal and a second track in several discrete bins spaced around the periphery of the magnetic drum, a plurality of second magnetic read heads arranged around the second track on the recording drum for reading out the several replicas of the first output averaged signals in parallel, second demodulating circuit means coupled to the outputs of said second magnetic read out heads, second selector switching means coupled to the outputs of said second demodulating circuit means for selecting the number of first output averaged signal replicas to be averaged, second summing and dividing circuit means coupled to the outputs of said second selector switching means for deriving a second output averaged signal representative of the average of the several recorded first output averaged signal replicas, second gated output circuit means operatively coupled to the output of the second summing and dividing circuit means, said counter and divider network that is operatively coupled to the output from the clock read out head also being coupled and to the input of the second gated output circuit means for controlling the reading out of the second output averaged signal from the second summing and dividing circuit means at an appropriate point in the revolution of the magnetic recording drum, a third magnetic writing head mounted adjacent said magnetic recording drum, a third frequency modulation converter for converting an applied amplitude-modulated signal to a frequency modulation signal and applying the same to the magnetic writing head for recording several replicas of the second output averaged signal on a third track in several discrete bins spaced around the periphery of the magnetic drum, a plurality of third magnetic read heads arranged around the third track on the recording drum for reading out the several replicas of the second output averaged signal in parallel, third demodulating circuit means coupled to the outputs of said third read out heads, third selector switching means coupled to the outputs of said third demodulating circuit means for selecting the number of second output averaged signal replicas to be averaged, third summing and dividing circuit means coupled to the outputs of said third demodulating circuit means for deriving a third output averaged signal representative of the average of the several recorded second output averaged signal replicas, third gated output circuit means operatively coupled to the output of said third summing and dividing circuit means, said counter and divider network that operatively coupled to the output from the clock read out head also being coupled to the input of the third gated output circuit means for controlling the reading out of the third output averaged signal from the third summing and dividing circuit means at an appropriate point in the revolution of the magnetic recording drum.

15. A method of averaging a plurality of signals with minimum distortion due to signal transfers, said method comprising the steps of: storing a predetermined number of said signals in respective portions of first recording means; summing said stored signals and dividing the sum of said stored signals by the number of stored signals to develop an average of said stored signals; storing a manifestation representative of said average in a respective portion of second recording means each time said predetermined number of new signals is stored in said first recording means; and summing said representative manifestations stored in said second recording means and dividing the sum of said stored representative manifestations by the number of stored representative manifestations to develop an average of said stored representative manifestations.

References Cited

UNITED STATES PATENTS

| 2,789,761 | 4/1957 | Merrill et al. | 235—183 |
| 3,079,084 | 2/1963 | Briney et al. | 235—183 |

MALCOLM A. MORRISON, *Primary Examiner.*

J. F. RUGGIERO, *Assistant Examiner.*